US007446446B2

(12) United States Patent
Kodani

(10) Patent No.: US 7,446,446 B2
(45) Date of Patent: Nov. 4, 2008

(54) ROTARY ELECTRONIC COMPONENT

(75) Inventor: Takashi Kodani, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 313 days.

(21) Appl. No.: 11/437,644

(22) Filed: May 22, 2006

(65) Prior Publication Data

US 2006/0267444 A1 Nov. 30, 2006

(30) Foreign Application Priority Data

May 31, 2005 (JP) ............................ 2005-158706

(51) Int. Cl.
*H02K 49/00* (2006.01)
*H02P 15/00* (2006.01)

(52) U.S. Cl. ..................................................... 310/103

(58) Field of Classification Search ................. 310/103, 310/104; 200/11 DA, 11 G, 14, 11 TC, 61, 200/46, 564, 336
See application file for complete search history.

(56) References Cited

U.S. PATENT DOCUMENTS

| | | | |
|---|---|---|---|
| 5,847,335 A * | 12/1998 | Sugahara et al. | 200/4 |
| 6,784,383 B2 * | 8/2004 | Sugahara et al. | 200/11 R |

FOREIGN PATENT DOCUMENTS

| | | |
|---|---|---|
| JP | 08-039603 | 2/1996 |
| JP | 11-273504 | 10/1999 |
| JP | 3-196513 | 6/2001 |

* cited by examiner

*Primary Examiner*—Javaid Nasri
(74) *Attorney, Agent, or Firm*—McDermott Will & Emery LLP

(57) ABSTRACT

A rotary electronic component of the present invention has a sealed structure for the upper part of a contact section toward the side of an operating knob. In this structure, a rotor with a lower ring magnet is rotatably disposed on a concavity of a case with an open top. The top of this concavity is sealed with a sheet. An operating member with operating knob provided with an upper ring magnet is disposed on the sheet so that the rotor and the operating member co-rotate by the attractive force between the magnets.

4 Claims, 7 Drawing Sheets

FIG. 8 *(PRIOR ART)*
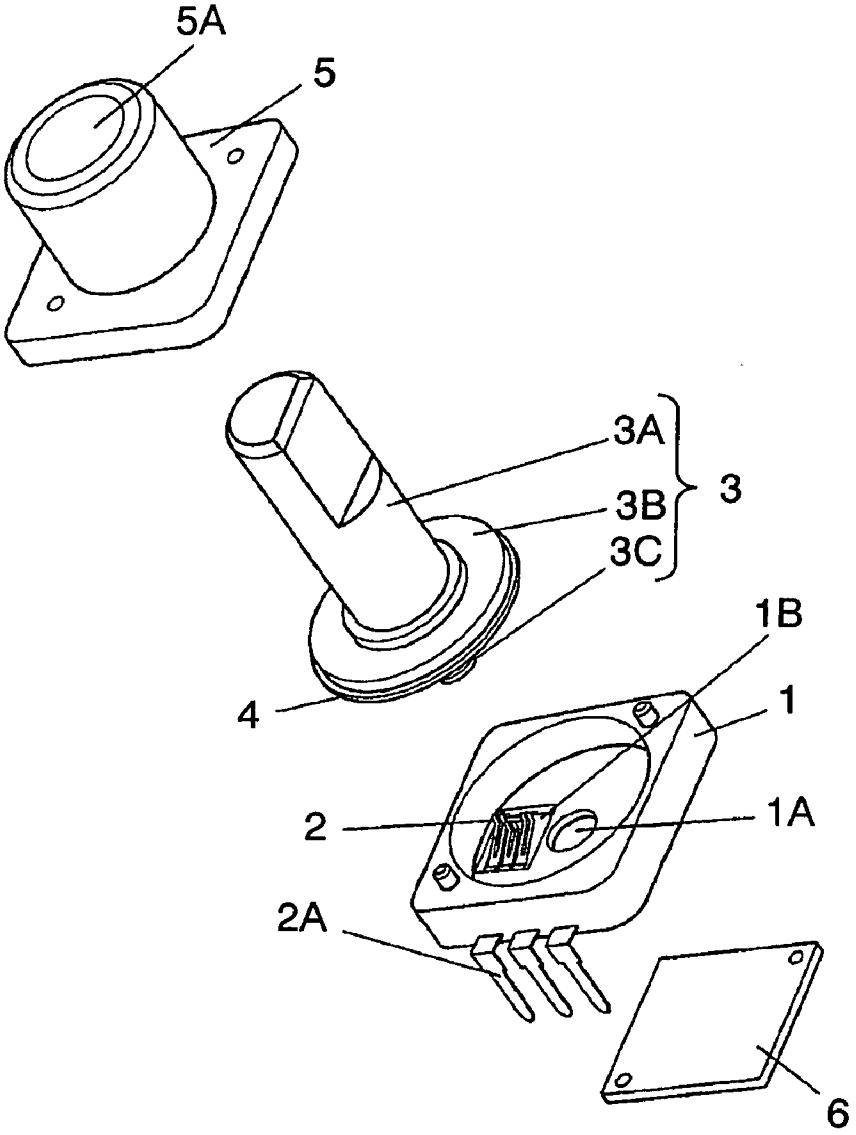

ROTARY ELECTRONIC COMPONENT

BACKGROUND OF THE INVENTION

1. Field of the Invention

The present invention relates to rotary electronic components used for configuring an input device for electronic equipment.

2. Background Art

A conventional rotary electronic component is described below, taking a rotary encoder as an example of a general structure, with reference to drawings.

FIG. 7 is a sectional view and FIG. 8 is an exploded perspective view of a conventional rotary encoder.

In FIGS. 7 and 8, case 1 made of insulating resin has a box shape with an open top. Round hole 1A is created at the center of its concavity. Multiple fixed resilient contacts 2 are fixed to the bottom of case 1.

The other ends of fixed resilient contacts 2 are led out from the side of case 1 as terminals 2A.

Flat strips of these fixed resilient contacts 2 before being bent are fixed to case 1 by insert resin molding. Then, fixed resilient contacts 2 are bent to a predetermined shape inclining upward in window 1B (FIG. 8) created at the bottom of the concavity.

In rotor 3 made of insulating resin, flange 3B is integrally molded to a lower part of roughly cylindrical operating knob 3A protruding upward. Cylindrical central protrusion 3C is rotatably fitted to round hole 1A on case 1. Central protrusion 3C is provided at the center of the bottom face of flange 3B. Rotary contact member 4 is also fixed to the bottom face of flange 3B housed in the concavity. This rotary contact member 4 is made of a metal sheet, is patterned to generate a predetermined encoder signal, and makes elastic contact with fixed resilient contacts 2.

Bearing 5 is attached to case 1. A middle part of operating knob 3A of rotor 3 is rotatably fitted to round hole 5A on this bearing 5. Resin cover sheet 6 is disposed underneath case 1 for covering round hole 1A and window 1B on case 1 so as to prevent dust from settling on the contacts inside case 1.

In the conventional rotary encoder as configured above, rotor 3 rotates when operating knob 3A is rotated. Rotary contact member 4, fixed to the bottom face of flange 3B of rotor 3, then rotates relative to each fixed resilient contact 2 such that predetermined encoder signals are achievable via each terminal 2A.

One of the prior-art documents related to this conventional rotary encoder is disclosed in Japanese Patent Unexamined Publication No. H11-273504.

In the above conventional rotary electronic component (rotary encoder), round hole 1A and window 1B, which are through holes, are created at the bottom of case 1, and are covered with cover sheet 6. This prevents dust from entering from the bottom. However, since a predetermined clearance is needed between operating knob 3A and hole 5A on bearing 5 in order to rotate operating knob 3A with a predetermined rotation force, it is difficult to prevent dust and moisture from entering inside to the contacts from the top.

SUMMARY OF THE INVENTION

A rotary electronic component of the present invention includes a case, rotor, lower magnet, sheet, operating member, and upper magnet. A fixed resilient contact is disposed inside a concavity with an open top of the case. The rotor is rotatably disposed inside the concavity. A movable contact which makes contact with the fixed resilient contact is fixed to the rotor. The lower magnet is fixed to the rotor on the face which is opposite the face where the movable contact is fixed. The sheet has a sliding part on its top and bottom faces, and is secured to the case so as to seal a contact section including fixed resilient contact and movable contact inside the concavity. The operating member is rotatable, and is disposed on the sheet opposing the rotor. The upper magnet is fixed to the operating member on the face contacting the sheet. The operating member and rotor which are disposed at opposing positions with the sheet in between co-rotate in the attached state attracted to each other by the attractive force between upper magnet and lower magnet. In addition, both operating member and rotor rotate while sliding against the sheet due to the effect of each sliding part on the sheet. Accordingly, the rotation of the operating member is transmitted to rotor, and the contact section is activated.

With this structure of the present invention, the top part, which faces toward the operating knob, of the rotary contact section activated by rotating the operating knob can be sealed, even though the contact section is disposed inside the concavity with an open top. Accordingly, the present invention offers a rotary electronic component with improved dust-resistance.

BRIEF DESCRIPTION OF THE DRAWINGS

FIG. 8 is an exploded perspective view of the conventional rotary encoder.

DETAILED DESCRIPTION OF THE INVENTION

Figure 1:
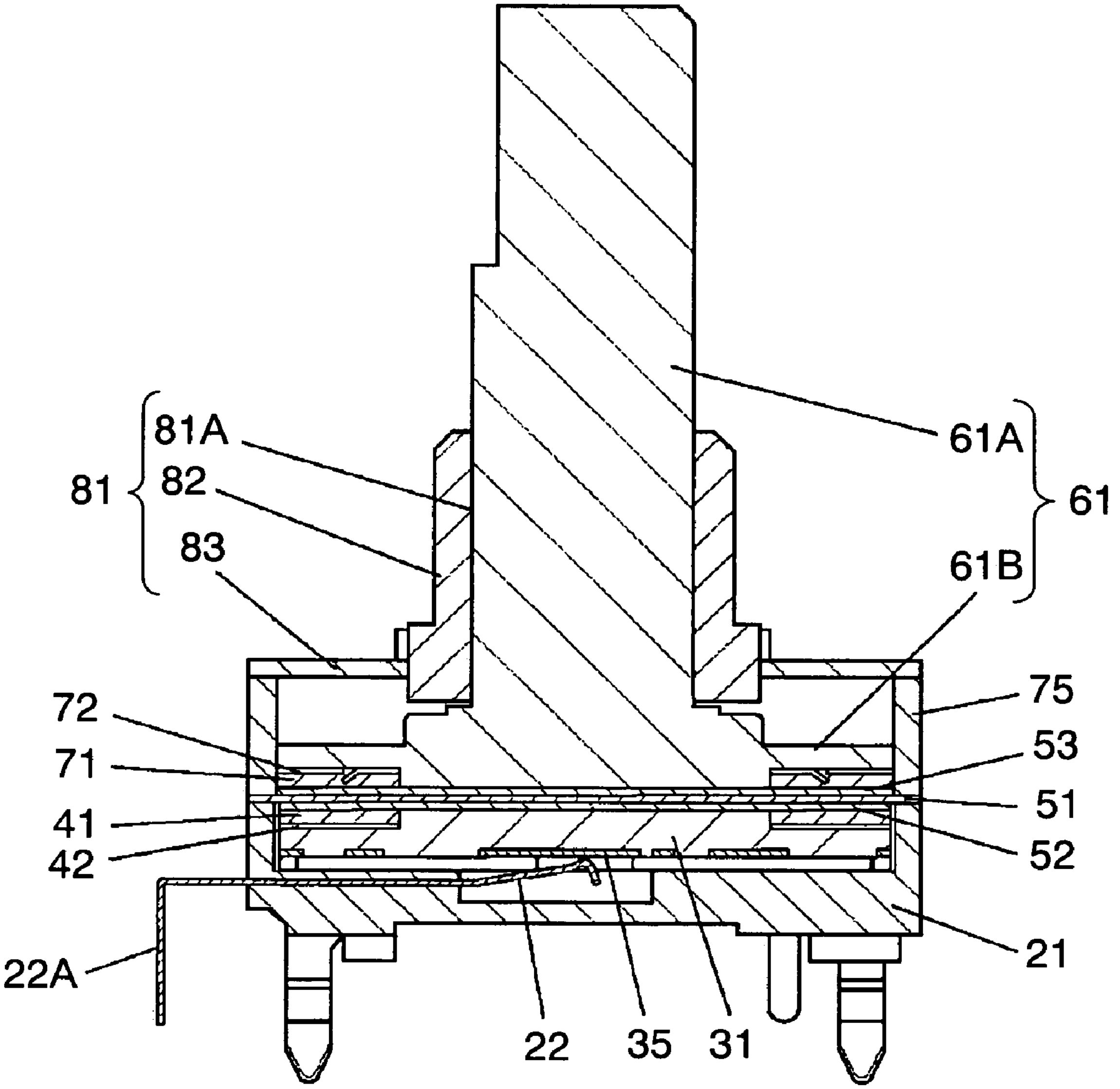
FIG. 1 is a sectional view of a rotary encoder at the position of elastic contact between a fixed resilient contact and a rotary contact in accordance with a preferred embodiment of the present invention.
Figure 2:
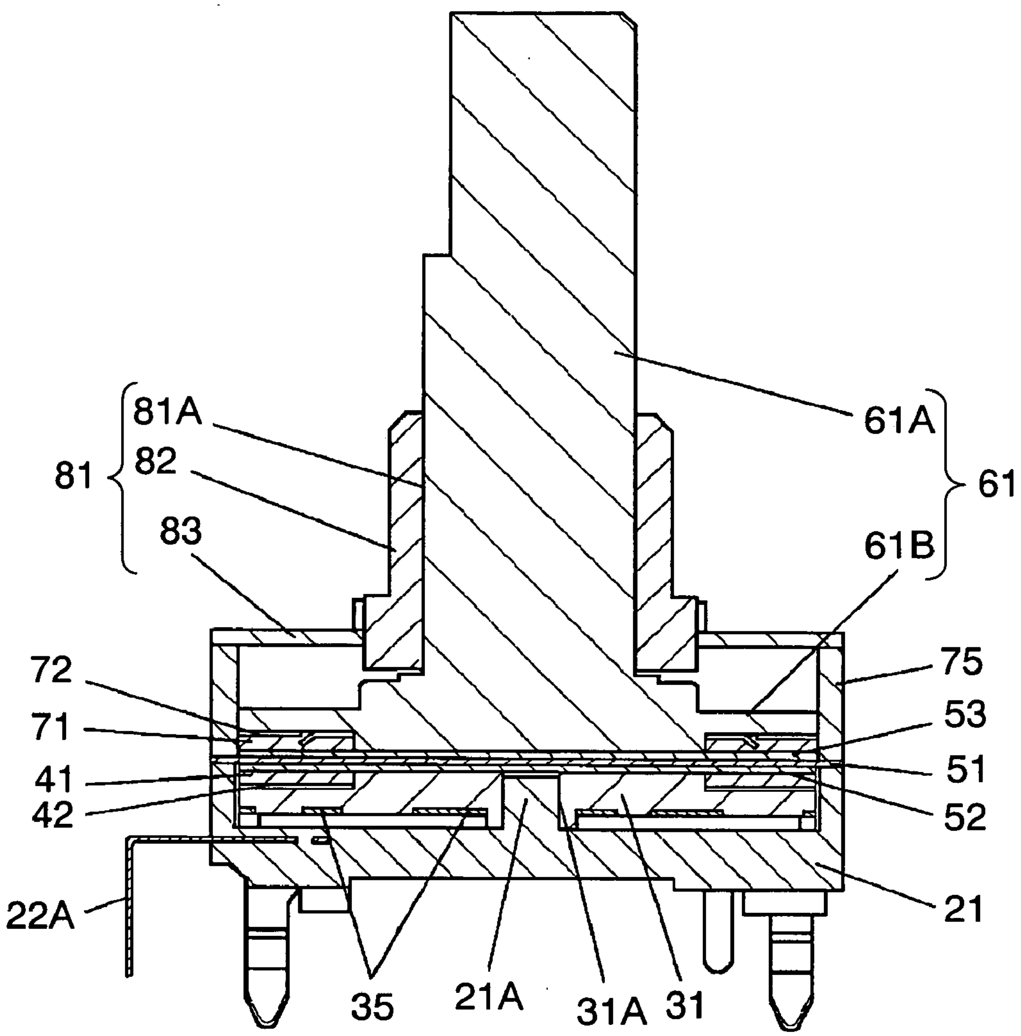
FIG. 2 is a sectional view at the center of the rotary encoder in accordance with the preferred embodiment of the present invention.

FIG. 1 is a sectional view at the position of elastic contact between a fixed resilient contact and a rotary contact of a rotary encoder in a preferred embodiment of the present invention. FIG. 2 is a sectional view at the center of the rotary encoder, and FIG. 3 is an exploded view of the rotary encoder.

Figure 3:
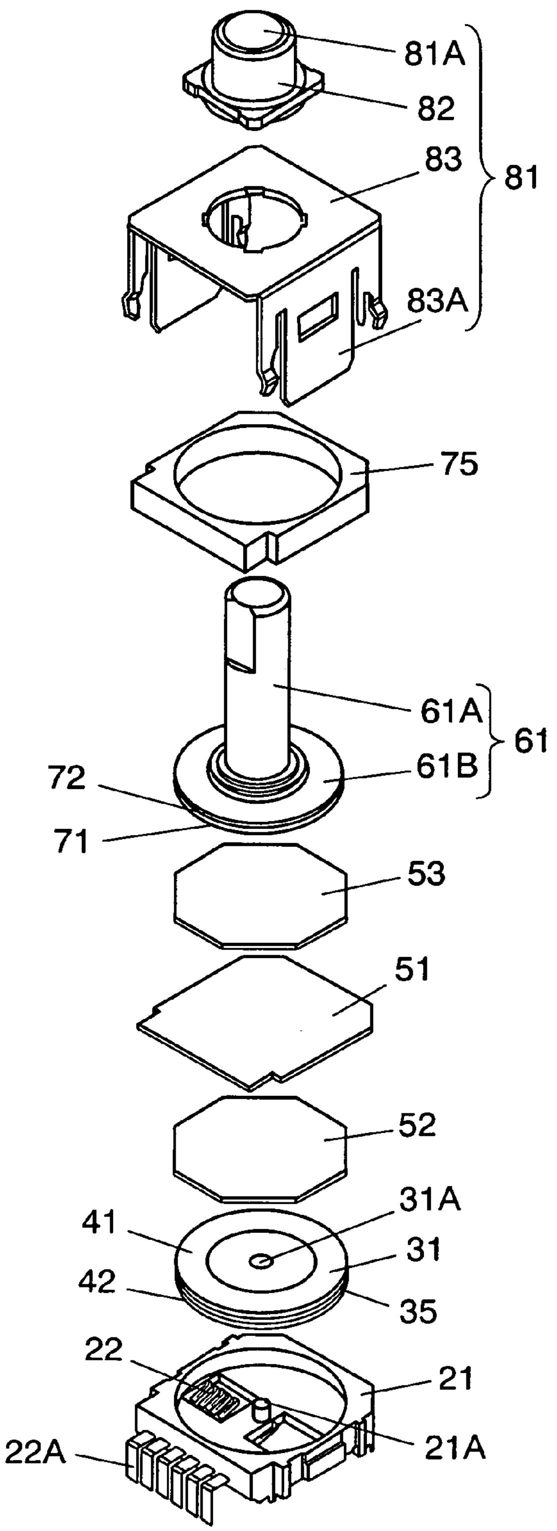
FIG. 3 is an exploded perspective view of the rotary encoder in accordance with the preferred embodiment of the present invention.

As shown in FIGS. 1 to 3, case 21 is made of insulating resin, and has a concavity with an open top. Cylindrical central protrusion 21A is provided at the bottom center of this concavity. Multiple fixed resilient contacts 22 are fixed to around central protrusion 21A. The other ends of these fixed resilient contacts 22 are led out from the side of case 21 as terminals 22A.

Fixed resilient contacts 22 are fixed to this case 21 by insert molding which is a method disclosed in Japanese Patent No. 3196513. Unlike a conventional case, no through window is created at the bottom of the case, as shown in FIG. 1.

Figure 4:
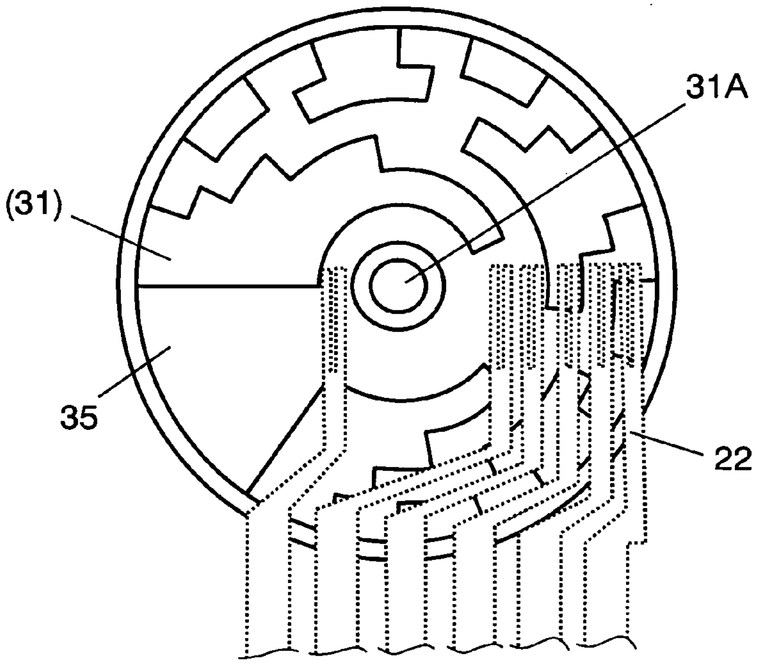
FIG. 4 illustrates the state of elastic coupling of the fixed resilient contact and rotary contact which is a key part of the rotary encoder in accordance with the preferred embodiment of the present invention.

Disk-like rotor 31 made of insulating resin has central round hole 31A. This rotor 31 is disposed inside the concavity of case 21 in a way such that central protrusion 21A is fitted into central round hole 31A so that rotor 31 can rotate relative to case 21. This structure is most simple and preferable because the rotation center of rotor 31 can be positioned. Rotary contact member 35 made of a metal sheet is fixed to the bottom face of rotor 31 as a movable contact. Tips of fixed resilient contacts 22 inclining upward make elastic contact with rotary contact member 35 fixed to the bottom face of rotor 31. These fixed resilient contacts 22 and rotary contact member 35 configure a rotary contact section. For example, as shown in FIG. 4, tips of multiple fixed resilient contacts 22 make elastic contact with rotary contact member 35 patterned as contacts of an absolute encoder.

Figure 5:
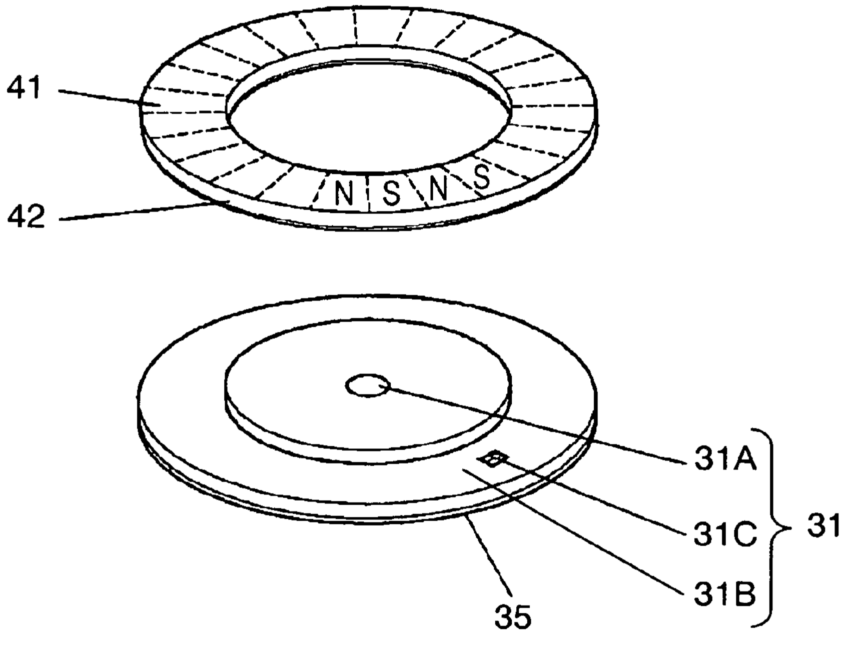
FIG. 5 is a perspective view of the rotary encoder before fixing the rotor to a lower ring magnet with magnetic sheet, which is a key part, in accordance with the preferred embodiment of the present invention.

As shown in a perspective view in FIG. 5, the circumference of the top face of rotor 31 is lowered by one step to form step 31B. Lower ring magnet 41 with a magnetic sheet 42 on its bottom face is fixed to this step 31B in a way such that the center of this lower ring magnet 41 is positioned with respect to the central axis of central round hole 31A. As shown in the same drawing, this lower ring magnet 41 is magnetized to the north pole and south pole alternately at a predetermined angular pitch. A small projection (not illustrated) is provided on the bottom face of lower ring magnet 41, and this small projection is inserted into one reference hole 31C created on step 31B of rotor 31 so that lower ring magnet 41 is positioned with respect to rotor 31. In this state, lower ring magnet 41 and rotor 31 are fixed typically using adhesive. Magnetic sheet 42 is provided so as to prevent leakage of unwanted magnetic flux to the lower part, and also to increase magnetic flux applied to the upper part. Magnetic sheet 42 has a ring shape which is substantially identical to lower ring magnet 41.

Sheet 51 made of an insulating film such as polyethylene terephthalate is secured to the top edge of case 21 typically using adhesive for sealing the concavity of case 21. Lower sliding sheet 52 made of an insulating film such as polytetrafluoroethylene is provided between the bottom face of sheet 51 and the top face of rotor 31. This lower sliding sheet 52 has a slightly larger diameter than rotor 31, and demonstrates good sliding performance against rotor 31 and lower ring magnet 41.

Operating member 61 made of insulating resin includes operating knob 61A and flange 61B. Operating knob 61A is roughly cylindrical and protrudes upward. Flange 61B has a diameter same as that of rotor 31, and is formed on a lower part of operating knob 61A in protruding fashion.

Figure 6:
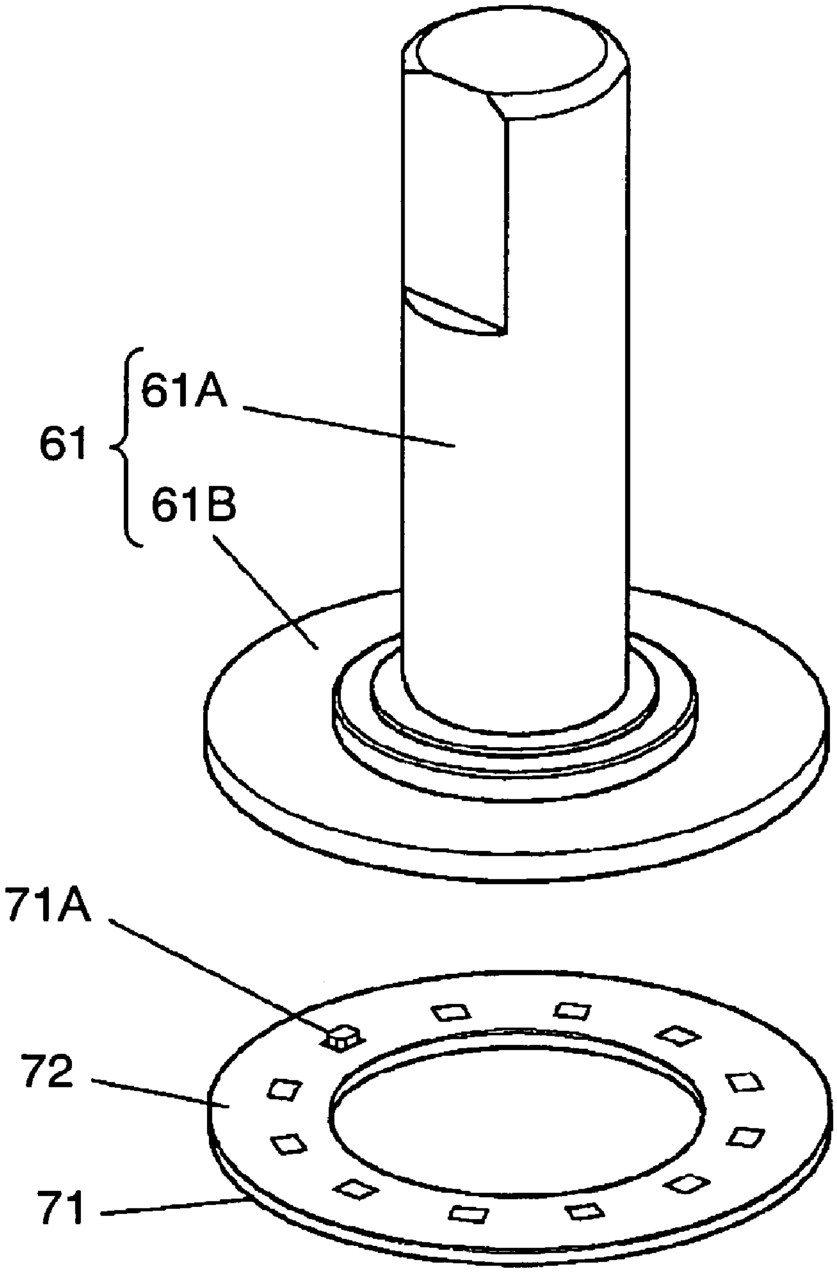
FIG. 6 is a perspective view of the rotary encoder before fixing the operating member to an upper ring magnet with magnetic sheet, which is a key part, in accordance with the preferred embodiment of the present invention.
Figure 7:
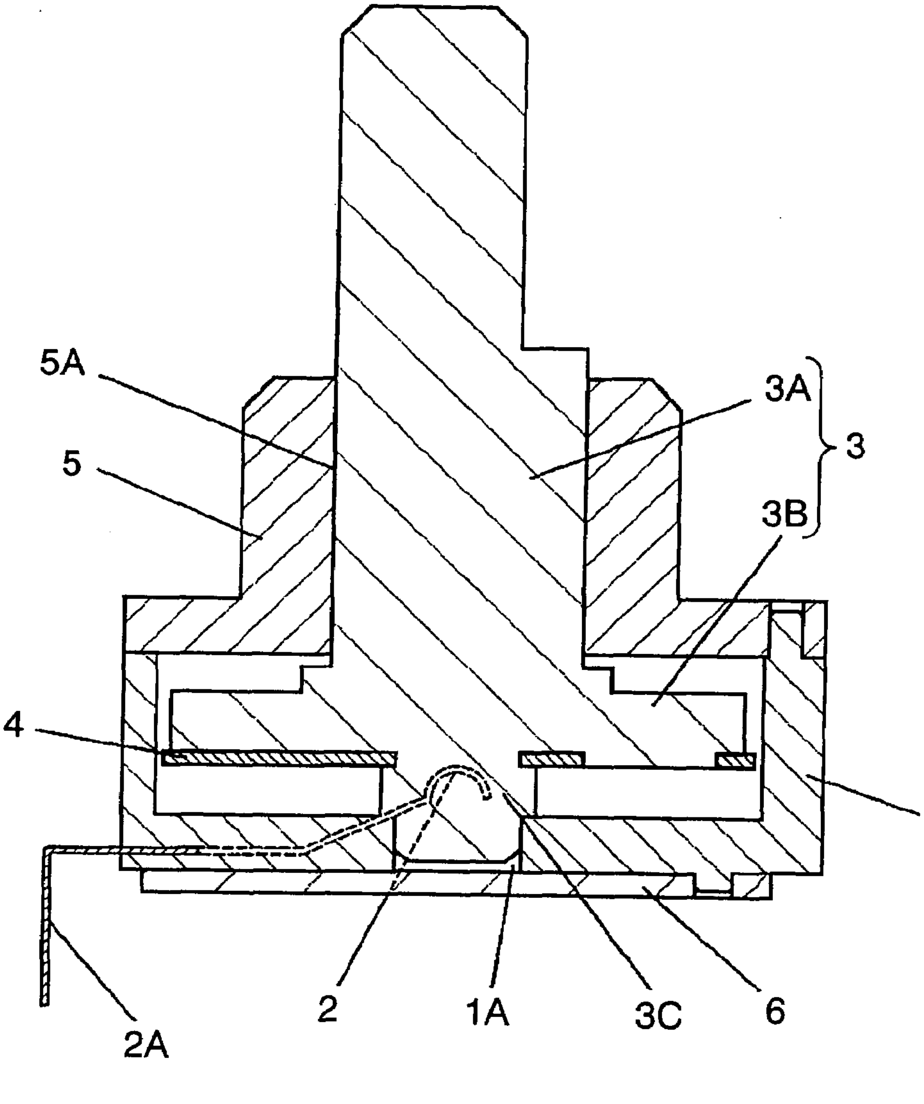
FIG. 7 (PRIOR ART)
FIG. 7 is a sectional view of a conventional rotary encoder.

As shown in a perspective view in FIG. 6, upper ring magnet 71 with magnetic sheet 72 on its top face is fixed to the bottom face of flange 61B in a way such that the center of upper ring magnet 71 is positioned with respect to the center axis of operating knob 61. Here, lower ring magnet 41 with magnetic sheet 42 is flipped upside down and used as upper ring magnet 71 with magnetic sheet 72. Small projection 71A protruding upward is inserted into one reference hole (not illustrated) on the bottom face of flange 61B so that upper ring magnet 71 with magnetic sheet 72 is positioned with respect to operating member 61. In this state, upper ring magnet 71 and operating member 61 are fixed typically using adhesive. Similar to magnetic sheet 42, magnetic sheet 72 is provided so as to prevent leakage of unwanted magnetic flux to the upper part and to increase the magnetic flux to the lower part.

Operating member 61 is placed on upper sliding sheet 53 disposed on top of sheet 51, and operating knob 61A is rotatably fitted to hole 81A on bearing 81. This bearing 81 is configured by fixing tubular member 82 with hole 81A to metal cover 83 such as by caulking. Resin spacer 75 is placed over case 21 for balancing the thickness of flange 61B.

Metal cover 83 of bearing 81 has a pair of legs 83A hanging down. These legs 83A hold the bottom face of case 21 and are caulked. This combines and fixes spacer 75, case 21, and bearing 81.

Similar to lower sliding sheet 52, upper sliding sheet 53 is made of an insulating film such as polytetrafluoroethylene, and demonstrates good sliding performance against operating member 61 and upper ring magnet 71. Upper sliding sheet 53 has a diameter slightly larger than that of flange 61B. Upper sliding sheet 53 is provided between flange 61B and sheet 51.

Operating member 61 and rotor 31 are disposed at vertically opposing positions with sheet 51, lower sliding sheet 52, and upper sliding sheet 53 in between.

Since different poles of lower ring magnet 41 and upper ring magnet 71 attract each other, operating member 61 and rotor 31 are coupled in co-rotatable fashion by the attractive force between the magnets.

The rotary encoder (rotary electronic component) in the preferred embodiment of the present invention is configured as described above. Its operation is described next.

First, when operating knob 61A of operating member 61 is rotated, the bottom face of flange 61B of operating member 61 slides against upper sliding sheet 53, and operating member 61 rotates without pulling sheet 51. Accordingly, upper ring magnet 71 fixed to flange 61B rotates.

In response to the rotation of upper ring magnet 71, lower ring magnet 41 which is attracted by upper ring magnet 71 and rotor 31 which is fixed to lower ring magnet 41 also co-rotate in synchronization with operating member 61. Here, rotor 31 rotates centering on central protrusion 21A. Rotor 31 also rotates without pulling sheet 51 because rotor 31 and the top face of lower ring magnet 41 slide against lower sliding sheet 52.

In response to the rotation of this rotor 31, rotary contact member 35 rotates relative to fixed resilient contacts 22. A predetermined signal in accordance with a pattern formed on rotary contact member 35 is thus generated. This signal is gained via each terminal 22A.

As described above, operating member 61 with operating knob 61A and rotor 31 are separate members, but they are coupled in co-rotatable fashion by magnetic attraction in the preferred embodiment. The contact section is configured on the side of rotor 31, and is housed inside the concavity of case 21. Since sheet 51 seals the concavity of case 21 including rotor 31, the dust-resistance and water-resistance of the contact section, including the upper part toward operating knob 61A, can be improved.

In this structure, in which rotor 31 rotates centering on central protrusion 21A in the concavity of case 21, signals can be stably generated from the contact section during rotation by disposing rotary contact member 35 and fixed resilient contacts 22 with reference to the position of central protrusion 21A.

A ring shape is preferable for the magnets which attract operating member 61 and rotor 31 in a co-rotatable fashion in the above description, since stable coupling is established by attracting operating member 61 and rotor 31 over the entire circumference. However, it is apparent that magnets of other shapes are also applicable.

As described above, the provision of upper sliding sheet 53 and lower sliding sheet 52 on the top and bottom faces of sheet

51 allow the use of inexpensive sheet 51 with a predetermined area needed for sealing the concavity. However, the present invention may also be configured by using a sheet with a sliding part in which a sliding layer is already formed on its top and bottom faces, instead of providing upper sliding sheet 53 and lower sliding sheet 52.

The preferred embodiment describes an example of an absolute rotary encoder. It is apparent that the concept of the present invention is applicable to other general rotary electronic components including incremental rotary encoders, rotary variable resistors, and rotary switches.

The rotary electronic component of the present invention has a structure that allows sealing of the upper part of the contact section toward the operating knob, even though the rotary contact section activated by rotating the operating knob is disposed inside the concavity with an open top. Accordingly, the present invention improves dust-resistance, and therefore serves effectively in an input device for a range of types of electronic equipment.

What is claimed is:

1. A rotary electronic component comprising:

a case having a fixed resilient contact in its concavity with an open top;

a rotor rotatably disposed inside the concavity, a movable contact being fixed to the rotor, the movable contact making contact with the fixed resilient contact;

a lower magnet fixed to the rotor on a face which is opposite a face where the movable contact is fixed;

a sheet with a sliding part on its top and bottom faces, the sheet being secured to the case so as to seal a contact section, including the fixed resilient contact and the movable contact, inside the concavity;

a rotatable operating member disposed on the sheet, the operating member opposing the rotor; and an upper magnet fixed to the operating member on a face contacting the sheet;

wherein the contact section activates through:

a co-rotation of the operating member and the rotor in an attached state, the operating member and the rotor being disposed at opposing positions with the sheet in between and attracted to each other by an attractive force between the upper magnet and the lower magnet, and transmission of a rotation of the operating member to the rotor while both the operating member and the rotor slide and rotate against the sheet due to an effect of each of the sliding parts on the sheet.

2. The rotary electronic component as defined in claim 1, wherein a separate sliding sheet is attached as the sliding part of the sheet.

3. The rotary electronic component as defined in claim 1, wherein the lower magnet and the upper magnet are ring magnets magnetized to the north pole and south pole alternately at a predetermined angular pitch.

4. The rotary electronic component as defined in claim 1, wherein a central protrusion is provided inside the concavity of the case, a central round hole corresponding to the central protrusion is provided at a center of rotation of the rotor, the central protrusion and central round hole are rotatably fitted, and the contact section is configured with reference to this fitting position.

* * * * *